(12) United States Patent
Pemberton

(10) Patent No.: US 8,113,213 B2
(45) Date of Patent: Feb. 14, 2012

(54) LIGHTED PORTABLE SAFETY ASHTRAY

(76) Inventor: James B. Pemberton, Nashville, TN (US)

( * ) Notice: Subject to any disclaimer, the term of this patent is extended or adjusted under 35 U.S.C. 154(b) by 935 days.

(21) Appl. No.: 12/154,534

(22) Filed: May 24, 2008

(65) Prior Publication Data

US 2008/0289641 A1  Nov. 27, 2008

Related U.S. Application Data

(60) Provisional application No. 60/931,867, filed on May 25, 2007.

(51) Int. Cl.
*A24F 19/09* (2006.01)
(52) U.S. Cl. ................ 131/241; 131/240.1; 131/231
(58) Field of Classification Search .............. None
See application file for complete search history.

(56) References Cited

U.S. PATENT DOCUMENTS

| | | | | | |
|---|---|---|---|---|---|
| 3,747,609 | A | * | 7/1973 | Glessner | 131/242.5 |
| 4,119,419 | A | * | 10/1978 | Passaro et al. | 96/399 |
| 4,725,998 | A | * | 2/1988 | Jones | 368/10 |
| 2003/0089722 | A1 | * | 5/2003 | Luedecke | 220/576 |

* cited by examiner

*Primary Examiner* — Richard Crispino
*Assistant Examiner* — Michael J Felton
(74) *Attorney, Agent, or Firm* — Frank B. Arenas, Esq.

(57) ABSTRACT

An article of manufacture is disclosed, a lighted portable safety ashtray, comprising:
at least one hollow outer body of a suitable height, width and depth, and;
at least one hollow inner body of a suitable height, width and depth, smaller than and inserted into the hollow outer body, and; at least one removable receptacle top disposed on the inner hollow body and outer hollow body further comprising an opening in the receptacle top, and; at least one light source, and;
at least one power supply, and; at least one electrical circuit in communication with the light source and the power supply, and; at least one electrical switch to open or close the electrical circuit in communication with the light source and the power supply.
Optional timer and electroluminescence light source is also disclosed.

10 Claims, 4 Drawing Sheets

4X SIZE

Bill of Materials

| ITEM | DESCRIPTION | PART NUMBER | MANUF | EACH |
|---|---|---|---|---|
| 1 | CAP, 0.039uf/25V X7R 0603 | | | 1 |
| 2 | CAP, 0.047uf/25V X7R 0603 | | | 2 |
| 3 | CAP, 0.1uf/25V X7R 0603 | | | 2 |
| 4 | RES, 2.21K 1% 1/8W 0603 | | | 2 |
| 5 | RES, 6.04K 1% 1/8W 0603 | | | 1 |
| 6 | RES, 10K 1% 1/8W 0603 | | | 1 |
| 7 | RES, 100K 1% 1/8W 0603 | | | 1 |
| 8 | RES, 1M 1% 1/8W 0603 | | | 1 |
| 9 | INVERTER, SSOP-8 | D355 | ROGER | 1 |
| 10 | TOUCH SENSOR SOT-23-6 | QT102 | QUAN | 1 |
| 11 | TRANSISTOR, PNP SOT-23 | BC858CLT1G | ON SEM | 1 |
| 12 | TRANSISTOR, NPN SOT-23 | BC850CLT1 | ON SEM | 1 |
| 13 | INDUCTOR 1.5uH SMT | ELL-6RH1R5M | PANA | 1 |
| 14 | EL WIRE, GRN 12" | TBD | | 1 |
| 15 | BATTERY 1.5V AA | | ANY | 2 |
| 16 | CONTACT TOUCH | 5209 | KYSTN | 1 |
| 17 | BATT CONTACT (+) | 5224 | KYSTN | 1 |
| 18 | BATT CONTACT (-) | 5202 | KYSTN | 1 |
| 19 | BATT CONTACT DUAL | 5212 | KYSTN | 1 |
| 20 | WIIRE, HOOK-UP 24AWG RED 4" | | | 1 |
| 21 | WIIRE, HOOK-UP 24AWG BLK 4" | | | 1 |
| 22 | PCB, SMT | CUSTOM | | 1 |
| 23 | | | | 0 |
| 24 | PLASTIC CUP | CUSTOM | | 1 |
| 25 | POLYCARBONATE TOP RING | CUSTOM | | 1 |
| 26 | BATTERY COMPARTMENT COVER | CUSTOM | | 1 |
| 27 | | | | 0 |
| 28 | LOGO w/EL BACK LIGHT | CUSTOM | | 0 |
| 29 | RIBBON CONN, 4P | TBD | | 0 |

FIG. 5

LIGHTED PORTABLE SAFETY ASHTRAY

CROSS REFERENCE TO RELATED APPLICATION

This Non-provisional application for patent incorporates by reference (to the extent that it does not conflict with the disclosure herein) and claims the benefit and priority of pending Provisional Application having Ser. No. 60/931,867 filed May 25, 2007 for "Lighted Portable Safety Ashtray," commonly owned with the instant Application.

BACKGROUND OF THE INVENTION

1. Field of the Invention

Versions and embodiments of the present invention relate generally to devices for cigar/cigarettes and disposal of cigar/cigarette ashes. More particularly, versions of the invention relate to cigar and cigarette ashtrays. Specifically, a version of the invention relates to a lighted portable vehicle ashtray device, system and method and new, useful and unobvious versions thereof.

2. Description of the Related Art

As is well understood by one skilled in the art, for many years the preferred method for disposal of cigar and/or cigarette ashes indoors and in vehicles has been with the use of ashtrays. The traditional ashtray has disadvantages, especially when used at night and in moving vehicles. First of all, accuracy of using a conventional ashtray is literally "hit or miss;" when missed, ashes are spread over areas that may cause damage or be a fire hazard. Secondly, when driving at night and/or inclement weather, it is distracting to the driver that is smoking to avert her eyes from the road to the ashtray, since the eyes need to be kept on the road ahead for safety. Additionally, the ashtray may not be visible to the driver, risking a fire in the moving vehicle if the ashtray is missed and hot ashes are accidentally put on flammable material in the vehicle.

What is needed today for safe disposal of ashes in moving vehicles is a portable lighted ashtray. This new, useful and unobvious "Lighted Portable Safety Ashtray" solves this need.

It is an object and/or advantage of versions of the invention to achieve an ashtray that is easier to hit precisely with the cigarette-held hand when used by the operator/smoker. Another object and/or advantage of versions of the invention is to allow a vehicle ashtray to minimize the time needed to visually locate the ashtray while driving at night or in inclement weather. Another object and/or advantage is to allow versions to be safely used in moving vehicles to reduce the incidence of hot ashes missing the ashtray and potentially becoming a fire hazard. At least one object and/or advantage is accomplished by at least one, some or all versions of the present invention.

SUMMARY OF THE INVENTION

The present versions of the invention address at least one, some or all of the above-referenced needs in the art by providing a new, useful and unobvious devices, systems and methods in versions of the invention for ashtray(s) and/or cigar/cigarette ash disposal uses.

Versions of the invention may be used as a lighted portable safety ashtray. Types of lights that may be utilized are LED (light emitting diode—well known in the art), electroluminescence (a general term for the luminescence exited by the application of an electric field to a system, usually in a solid state), incandescent, fluorescent, halogen, filament bulb, chemical-based lights, heat-based lights, and all other suitable type lights which are mentioned for illustration only and not intended to be limiting in scope of versions of the invention. Other embodiments use a touch sensitive switch to activate/deactivate the illumination means. Some versions use a timer to allow the user to set the time for which the illumination will remain on and then automatically switch off at a predetermined interval.

The preferred embodiment of the invention utilizes solid-state electroluminescent systems. Solid-state electroluminescent systems can be made quite thin, leading to applications in thin-panel area light sources and flat screens to replace cathode-ray tubes for electronic display and image formation.

Modern interest in electroluminescence dates from the discovery by G. Destriau in France in 1936 that when a zinc sulfide (ZnS) phosphor powder is suspended in an insulator (oil, plastic, or glass ceramic) and an intense alternating electric field is applied with capacitorlike electrodes, visible light is emitted. The phosphor, prepared from zinc sulfide by addition of a small amount of copper impurity, was later shown to contain particles of a copper sulfide ($Cu_2S$) phase in addition to copper in its normal role as a luminescence activator in the zinc sulfide lattice. The intensification of the applied electric field by the sharp conductive or semiconductive copper sulfide inhomogeneities is believed to underlie the mechanism of Destriau-type electroluminescence. Minority carriers are ejected from these high-field spots into the low- or moderate-field regions of the phosphor, where they recombine to excite the activator centers.

The application of electroluminescence to display and image formation received great impetus from work in the late 1960s and mid-1970s on thin-film electroluminescence (TFEL), giving rise to devices that are different in structure and mechanism from the Destriau conditions. The phosphor in these devices is not a powder but a thin (about 500 nanometers) continuous film prepared by sputtering or vacuum evaporation. The luminescence activators are manganese or rare-earth ions, atomic species with internal electronic transitions that lead to characteristic luminescence. The phosphor film does not contain copper sulfide or any other separate phase, and is sandwiched between two thin (about 200 nm) transparent insulating films also prepared by evaporative means. Conducting electrodes are applied to the outside of each insulating film; one of the electrodes is again a transparent coating of indium-tin oxide on glass, which serves as supporting substrate. If an imaging matrix is desired, both electrodes consist of grids of parallel lines, with the direction of the grid on one insulator (row) orthogonal to the other grid (column). By approximate circuitry the entire matrix can be scanned, applying voltage where desired to a phosphor element that is located between the intersection of a row and column electrode. A thin-film electroluminescent device acts like a pure capacitor at low applied voltage; no light is emitted until the voltage reaches a threshold value determined by the dielectric properties of the insulator and phosphor films. Above this threshold a dissipative current flows, and light emission occurs. The brightness increases very steeply with the applied voltage but is finally saturated. The light output, or average brightness, is roughly proportional to the frequency up to at least 5 kHz, and also depends on the waveform of the applied voltage.

The best thin-film electroluminescent phosphor is manganese-activated zinc sulfide, which emits yellow light peaking at 585 nm. Activation of zinc sulfide and certain alkaline earth sulfides with different rare earths has yielded many other promising electroluminescent phosphors emitting blue, green, red, and white, and making full-color matrix-addressed thin-film electroluminescent displays possible. The light output of thin-film electroluminescent displays has been very reliable, with typically only 10% loss after tens of thousands of hours of operation.

Injection electroluminescence results when a semiconductor pn junction or a point contact is biased in the forward direction. This type of emission, first observed from silicon carbide (SiC) in 1907, is the result of radiative recombination of injected minority carriers, with majority carriers being a material. Such emission has been observed in a large number of semiconductors. The wavelength of the emission corresponds to an energy equal, at most, to the forbidden band gap of the material, and hence in most of these materials the wavelength is in the infrared region of the spectrum. If a pn junction is biased in the reverse direction, so as to produce high internal electric fields, other types of emission can occur, but with very low efficiency.

Light emission may also occur when electrodes of certain metals, such as Al or Ta, are immersed in suitable electrolytes and current is passed between them. In many cases this galvanoluminescence is electroluminescence generated in a thin oxide layer formed on the electrode by electrolytic action. In addition to electroluminescence proper, other interesting effects (usually termed electrophotoluminescence) occur when electric fields are applied to a phosphor which is concurrently, or has been previously, excited by other means. These effects include a decrease or increase in steady-state photoluminescence brightness when the field is applied, or a burst of afterglow emission if the field is applied after the primary photoexcitation is removed.

Benefits, features and problems solved by versions of the invention include: an ashtray that is easier to hit precisely with the cigarette-held hand when used by the operator/smoker, allow a vehicle ashtray to minimize the time needed to visually locate the ashtray while driving at night or in inclement weather and be safely used in moving vehicles to reduce the incidence of hot ashes missing the ashtray and potentially becoming a fire hazard.

The foregoing objects, benefits and advantages of versions of the invention are illustrative of those which can be addressed by versions of the invention and not intended to be limiting or exhaustive of the possible advantages that can be realized. These and other advantages will be apparent from the description herein or can be learned from practicing versions of the invention, both as embodied herein as examples or as modified in view of any variations which may be apparent to those of ordinary skill in the art. Therefore, the invention resides in the novel devices, methods, arrangements, systems, combinations and improvements herein shown and described as examples and not limited therein.

It is understood that the versions of the inventions are new methods, devices and systems for the lighted portable safety ashtray.

BRIEF DESCRIPTION OF THE DRAWINGS

In the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered as limiting of its scope, the invention will be described and explained with additional specificity and detail through the use of the accompanying drawings in which:

FIG. 5 is a Bill of Materials for the components depicted in FIG. 3 and FIG. 4.

Figure 1:
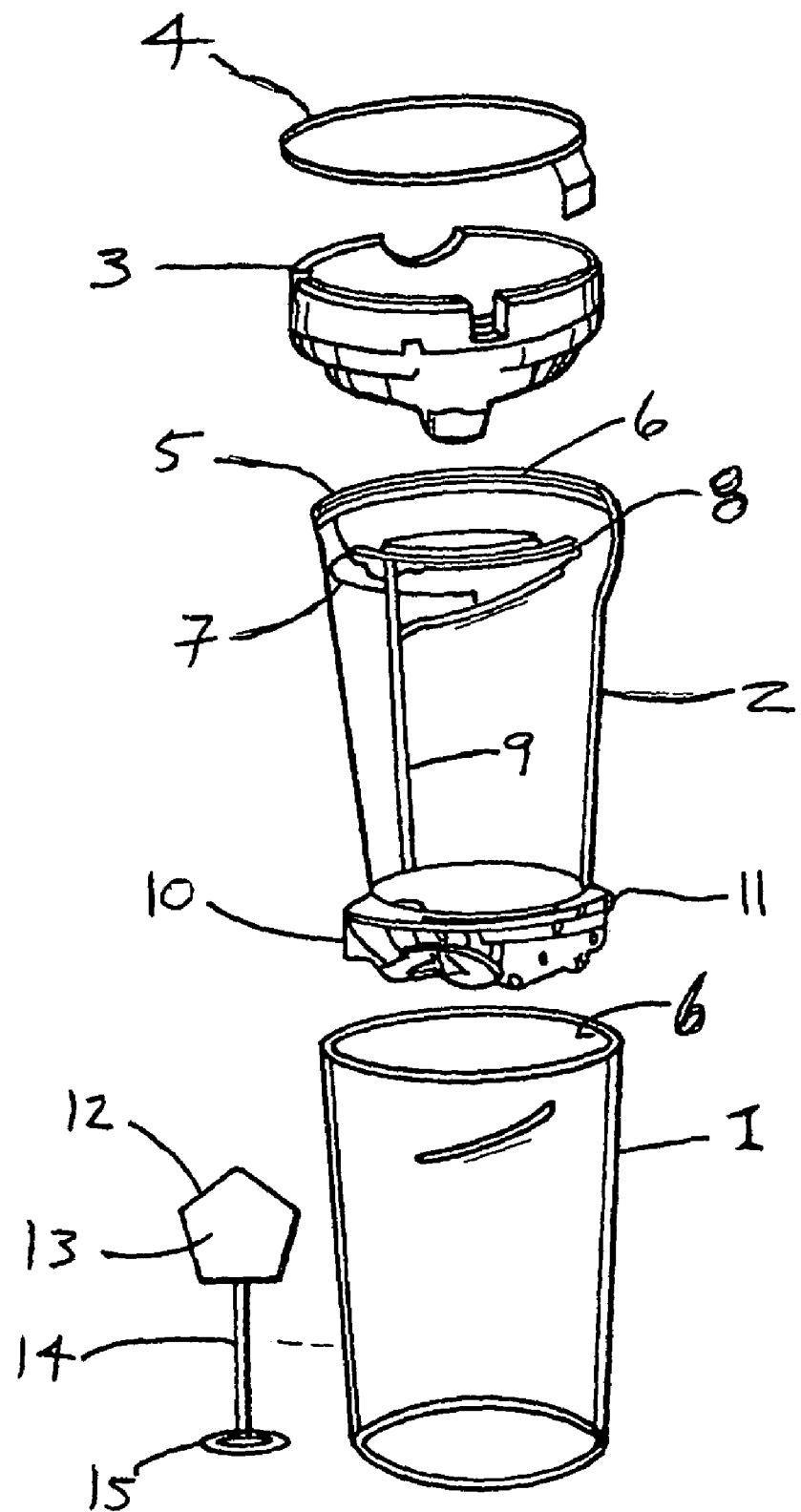
FIG. 1 is an "exploded" view of a version of the invention and components.

While the present invention will be described with reference to the details of the embodiments of the invention shown in the drawings (and some embodiments not shown in the drawings), these details are not intended to limit the scope of the invention.

DETAILED DESCRIPTION OF THE PREFERRED EMBODIMENT

The core of the version of the preferred embodiment of the invention is depicted in FIG. 1. The preferred materials for fabrication are clear, opaque and/or translucent plastic for the outer and inner cups and receptacle top.

It is also understood that whenever and/or is used in this patent application it means any combination or permutation of all, one, some, a plurality or none of each of the item or list mentioned, which is not intended to be limiting but merely for example and illustration. It is also understood that (s) designates either singular or plural. It is also understood that that "or" is an inclusive "or" to include all items in a list and not intended to be limiting and means any combination or permutation of all, one, some, a plurality or none of each of the item or list mentioned. It is also understood that "including" means "including but not limited to" any combination or permutation of all, one, some, a plurality or none of each of the item or list mentioned.

The apparatus of the invention is conveniently fabricated in the preferred embodiment by conventional and standard methods of forming, molding, injecting, heating, pressurizing, releasing and finishing in the plastic fabrication and injection molding arts using conventional and standard materials.

For example, versions of the invention and incorporated components may be fabricated from aluminum, steel or other like metals or any other suitable material (even cardboard or wood) as will be readily apparent to one of ordinary skill in the art. The present invention (or components of) may also be fabricated in best mode from non-metallic materials for lighter weight, reduced cost and resistance to corrosion. These non-metallic materials include, among others, conventional polymers such as, for example, polystyrene, polycarbonate, polyurethane, polyethylene, phenol formaldehyde resins, polybutylene, Teflon and the like.

Plastics (any one of a large and varied group of materials consisting wholly or in part of combinations of carbon with hydrogen, oxygen, nitrogen and other organic and inorganic elements; while solid in the finished state, at some stage in its manufacture, it is made liquid, and thus capable of being formed into various shapes, usually through the application of heat and/or pressure), such as monomer (one unit—the building block for polymer molecules) or polymer (many monomer units strung together to make long molecules) used in polymerization (the process of combining short molecules to make long molecules) may be used.

Thermoplastics (plastics that can be repeatedly softened and hardened by heating and cooling) as well as Thermosets (plastics that are cross-linked during polymerization and cannot be softened without degrading some linkages) may also be used.

Thermoplastic resin types such as crystalline (thermoplastics containing areas of dense molecular alignments known as crystallinity), amorphous (thermoplastics with no crystallinity in the solid state), liquid crystal polymers (LCPs) (stiff, rod-like structures organized in large paralleled arrays in both melted and solid states) may also be used.

All components may be referenced in plural for convenience, as only at least one of all components are necessary, if desired, for proper operation and use in other embodiments. Ideally, all components (or some components) are injection molded from non-metallic materials (plastic) as previously mentioned above. Fillers and reinforcements, commonly known in the industry, may also be used. Fiberglass resins, materials and methods may be used to make the invention. All specifications, methods, industry standards, etc. as disclosed by Injection Molding Resources (a trade organization; Injection Molding Resources, 5732 Milentz Ave., St. Louis, Mo. 63109 and their web site www.injection-molding-resources.org, incorporated by reference) and disclosed by other well-known-in-the-industry injection molding research and development organizations, commonly known in the industry, are hereby incorporated by reference.

To make the invention in its preferred embodiment, one skilled in the art would assemble and/or fabricate, for example, the three main components; the outer cup (outer hollow body) 1 the inner cup (inner hollow body smaller than the outer hollow body) 2 and the receptacle top 3 with its closure optionally pivoted down (funnel shaped) to the center opening where cigarettes or butts may be dropped and extinguished. All sections may be made of injection molded plastic. As shown in FIG. 1, the three main sections consist of subcomponents listed as follows: metal touch ring 4, electroluminescent light wire 5, optional locking threads 6, switch wire 7, touch ring contact 8, power wire(s) 9, power supply 10 and electronic circuit 11. The optional locking threads 6 located in the top inside area of the outer cup 1 on the inside surface area consisting of two raised plastic areas curving up from the bottom of the outer cup 1. Optional outside logo area illuminated by a geometric polygon (or any other desired shape) area 12 on the outside surface made of electroluminescent film 13 with internal film wire lead(s) 14 passing through the surface to the inner contacts 15 located on the bottom of the inner cup 2.

Figure 3:
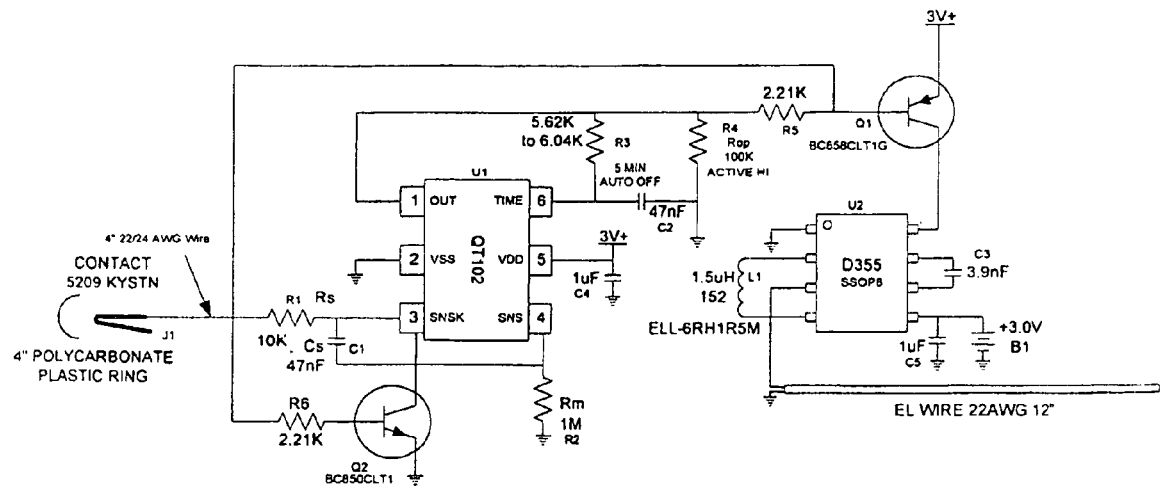
FIG. 3 is a schematic view of a version of an electrical circuit that may be used with versions of the invention.
Figure 4:
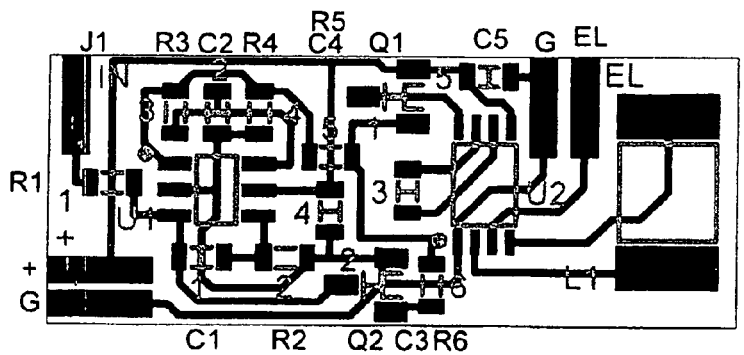
FIG. 4 is a version of a printed circuit board (shown four times actual size) showing the actual components of the electrical circuit shown in FIG. 3.

To manufacture/make a preferred embodiment of the invention, using an Electroluminescent Lighting Circuit w/5 Minute Timer:
The circuit as shown in FIG. 3 and FIG. 4 is made from easily obtainable Industry Standard components available from Digi-Key and other component Distributors. All parts required are detailed on the Bill of Materials. Additionally, a custom designed Printed Circuit Board (PCB) is required to mount and connect the components per the schematic, and to interface the electronics to the physical device and the end-user.
Once the PCB and components are obtained, the manufacturing process can commence. The process will entail the use of robotic Pick and Place machinery to place all the components onto the PCB and solder them in place. Fabrication and connection of the wired components (Battery Contacts, Touch Contact, and (EL) Electroluminescent Wire) will involve automated wire forming equipment, hand soldering techniques, and QA inspections, as well as a Test to ensure proper operation.

The cup components, once molded, can then be mated with the electronics and the lighted portable safety ashtray can be packaged and sold.

The components may be attached, connected, linked, related, affixed, disposed on, integrated into, adjoined, combined, bonded, united, associated, joined, tied, secured, bound, rigidly attached, flexibly attached, attached with rotational freedom in at one least axis, and/or integrated onto each other as desired by the operator.

At least one of the basic components is necessary but a plurality may be utilized if desired for different versions of the invention.

Figure 2:
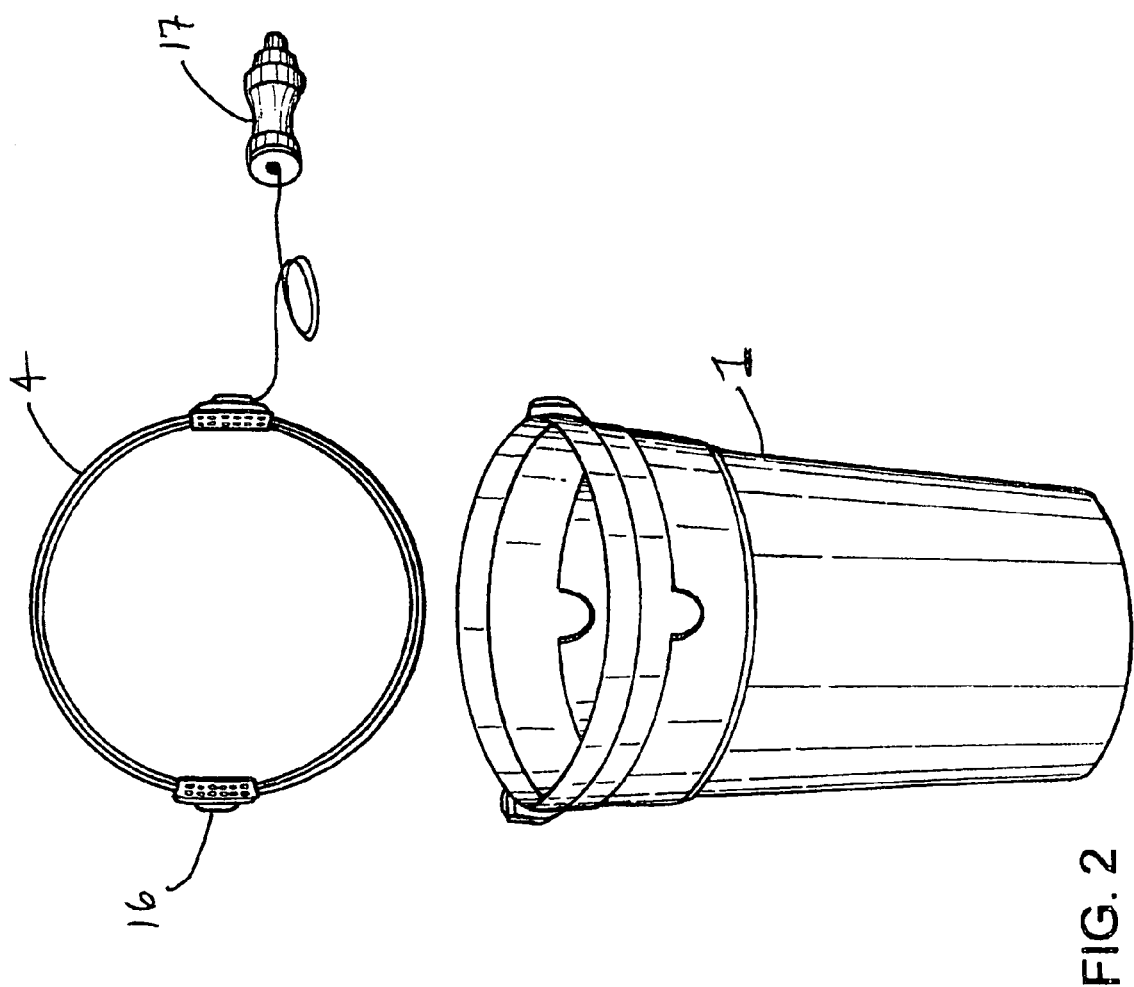
FIG. 2 is a view of another embodiment of the invention and components.

To use the invention in this embodiment, particularly with a motor vehicle cup-holder, the operator would place the device in the motor vehicle cup-holder, and touch the metal touch ring with a hand to illuminate the ashtray. To use in other similar low-light uses in home, office or field may be accomplished by placing the device on a suitable surface and touch the metal touch ring with a hand to illuminate the ashtray. While driving at night or in other low-light conditions a touch of the metal ring running the circumference of the receptacle top causes the electroluminescent light ring to light for a predetermined time utilizing an automatic timer circuit contained in the power supply. (and also lights the optional polygon logo area on outside cup if applied). A lighted cigarette or lighted cigarette butt inserted through the hole in the top center of the receptacle top of the device becomes extinguished. The extinguished butts remain stored inside the inner cup until the top is removed by the user and the contents discarded. In this version, the power supply located on the bottom of the inner cup is powered by two standard 1.5 volt "AA" or "AAA" batteries, for example. As shown in FIG. 2, wrist-watch type batteries 16 and/or power cords 17 (AC and/or DC) may also be used as power supplies/sources.

The above-referenced lists, options, functions, instructions, applications, interactions, items, products, goods, groups and sub-groups are merely intended as illustration and examples, and are not intended by the inventor to in any way limit the addition, deletion or modification of any said lists, options, functions, instructions, commands, applications, interactions, items, products, goods, groups and sub-groups as might be desirable or useful to someone skilled in the art. All components of the above-mentioned system are well known in the art.

As will be apparent to persons skilled in the art, such as a person in the plastic injection molding industry, electrical engineer, ashtray designer, smoking accessory designer or other similar-type individuals, various modifications and adaptations of the structure and method of use above-described will become readily apparent without departure from the spirit and scope of the invention, the scope of which is defined in the claims. Although the foregoing invention has been described in detail by way of illustration and example, it will be understood that the present invention is not limited to the particular description and specific embodiments described but may comprise any combination of the above elements and variations thereof, many of which will be obvious to those skilled in the art. Additionally, the acts and actions of fabricating, assembling, using, and maintaining the preferred embodiment of this invention is well known by those skilled in the art. The invention may be embodied in other specific forms without departing from the spirit or essential characteristics thereof. The present embodiment is therefore to be considered in all respects as illustrative and not restrictive, the scope of the invention being indicated by the claims rather than by the foregoing description, and all changes which come within the meaning and range of equivalency of the claims are therefore intended to be embraced therein.

I claim:

1. An article of manufacture, a lighted portable safety ashtray, comprising:
   - at least one outer cup of a suitable height, width and depth, and;
   - at least one inner cup of a suitable height, width and depth, smaller than and inserted into the outer cup, and;
   - at least one removable receptacle top disposed on the inner cup or outer cup further comprising an opening in the receptacle top, and;
   - at least one light source, and;
   - at least one power supply, and;
   - at least one electrical circuit in communication with the light source and the power supply, and;
   - at least one electrical switch to open or close the electrical circuit in communication with the light source and the power supply
   - wherein at least one of the electrical switches is a touch ring disposed on said removable receptacle top, and
   - wherein at least one of the light sources is disposed on the receptacle top in communication with the electrical circuit such that when the touch ring is touched by the operator, the light source emits light.

2. The article of claim 1 further comprising a timer integrated into said electrical circuit wherein the timer may be set by the operator for a predetermined interval to open and close said electrical circuit.

3. The article of claim 1 wherein the light source further comprises an electroluminescence light source.

4. A method of making an electroluminescence light source with a portable safety ashtray, said method comprising the steps of:
   a) providing at least one outer cup of a suitable height, width and depth, and;
   b) providing at least one inner cup of a suitable height, width and depth, smaller than and inserted into the outer cup, and;
   c) providing at least one removable receptacle top disposed on the inner cup or outer cup further comprising an opening in the receptacle top, and;
   d) providing at least one power supply, and;
   e) providing at least one electrical circuit in communication with the power supply, and;
   f) providing an electrical switch in the electrical circuit further comprising a touch ring disposed on said removable receptacle top, and;
   g) disposing on the receptacle top an electroluminescence light source in communication with the electrical circuit such that when the touch ring is touched by the operator, the electroluminescence light source emits light.

5. An article of manufacture, a lighted portable safety ashtray, comprising:
   - at least one outer means for cupping, and;
   - at least one inner means for cupping, smaller than and inserted into the outer means for cupping, and;
   - at least one removable means for receiving disposed on top of the inner means for cupping or outer means for cupping further comprising an opening in the means for receiving, and;
   - at least one illumination means, and;
   - at least one means for supplying power, and;
   - at least one electrical circuit means in communication with the illumination means and the means for supplying power, and;
   - at least one electrical switch means to open or close the electrical circuit means in communication with the illumination means and the means for supplying power
   - wherein at least one of the electrical switch means is a touch ring disposed on said removable means for receiving, and
   - wherein at least one of the illuminations means is disposed on the removable means for receiving in communication with the electrical circuit means such that when the touch ring is touched by the operator, the illumination means emits light.

6. The article of claim 5 further comprising a means for timing integrated into said electrical circuit means wherein the means for timing may be set by the operator for a predetermined interval to open and close said electrical circuit means.

7. The article of claim 5 wherein the illumination means further comprises an electroluminescence light source.

8. The article of claim 1 wherein said opening in said removable receptacle top further comprises a funnel in communication with said inner cup.

9. The article of claim 1 further comprising an electroluminescence light source of any shape disposed on the outer surface of said outer cup in communication with said power source.

10. The article of claim 9 further comprising indicia disposed on said electroluminescence light source of any shape disposed on the outer surface of said outer cup to convey information to visual senses.

* * * * *